O. J. F. BERGSTEN.
DRILL CHUCK.
APPLICATION FILED AUG. 21, 1911.
1,024,172.
Patented Apr. 23, 1912.
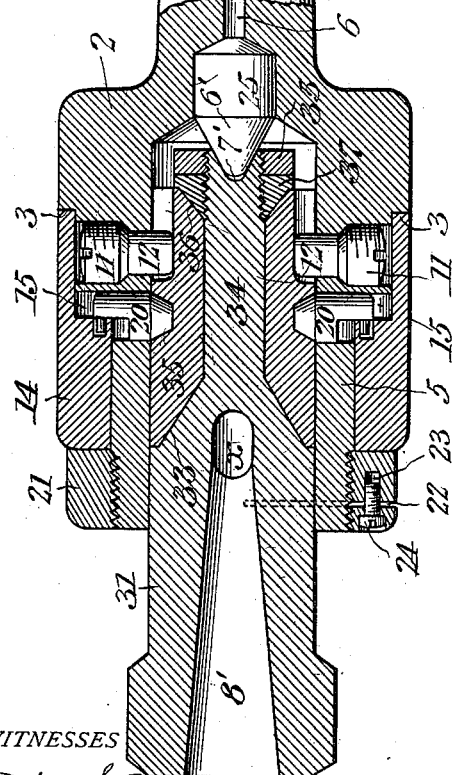

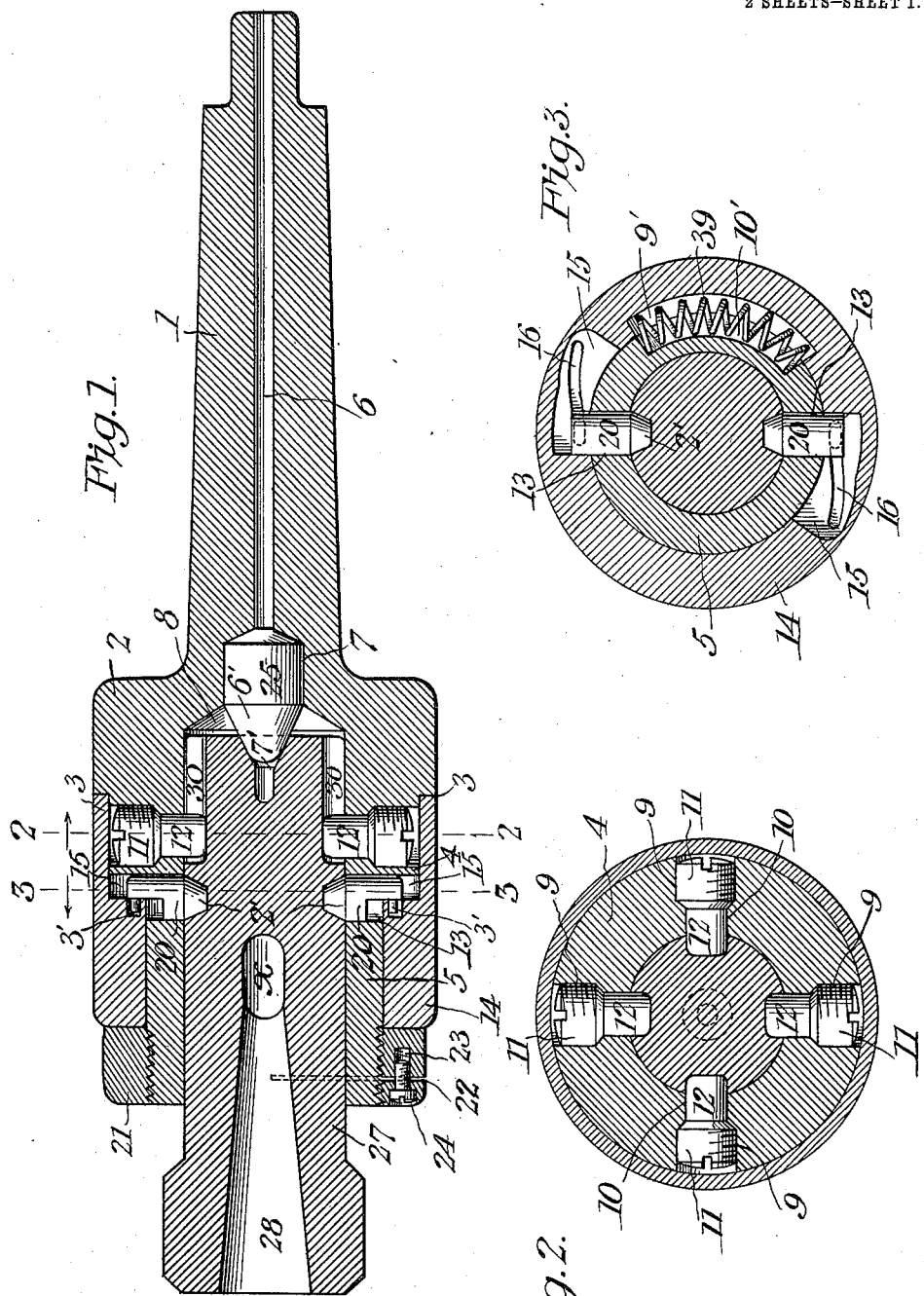

UNITED STATES PATENT OFFICE.

OSCAR J. F. BERGSTEN, OF WORCESTER, MASSACHUSETTS, ASSIGNOR OF ONE-HALF TO NILS BJORK, OF WORCESTER, MASSACHUSETTS.

DRILL-CHUCK.

1,024,172.      Specification of Letters Patent.      Patented Apr. 23, 1912.

Application filed August 21, 1911. Serial No. 645,152.

*To all whom it may concern:*

Be it known that I, OSCAR J. F. BERGSTEN, a citizen of the United States, and a resident of Worcester, in the county of Worcester and State of Massachusetts, have invented certain new and useful Improvements in Drill-Chucks, of which the following is a specification, reference being had to the accompanying drawings.
This invention has relation to an improvement in chucks employed in connection with drilling machines; and the object of my invention is to provide a device of this general character of a simple and inexpensive nature and of a compact and durable construction which shall be capable of convenient and accurate adjustment in position upon the spindle of a drilling machine, in a manner permitting the device being instantly changed into a tap holder, without stopping the machine.

Another object is to provide a drill chuck with an attachment so that the chuck can be adjusted to serve as a tap holder including a tensionally held friction sleeve, which prevents the breaking of taps.

A further object is to provide a drill chuck with a spring actuated sleeve which automatically holds the drill collet to serve as a release when it is necessary to change drills or substitute a tap.

A still further object is to provide a drill chuck which shall be free of side thrust on the drill when doing rapid drilling in using fast feed, as well as insuring a smooth, round, straight hole when the chuck is used to hold a reamer.

With these and other objects in view the present invention consists in the combination and arrangement of parts as will be hereinafter more fully described and finally pointed out in the appended claims, it being further understod that changes in the specific structure shown and described may be made within the scope of the claims, without departing from the spirit of the invention.

In the accompanying drawings forming a part of this specification, and in which like numerals of reference indicate similar parts in the several views: Figure 1, shows a central sectional view through a chuck embodying my invention, showing the drill holding collet in position. Fig. 2, is a section on line 2, 2, of Fig. 1. Fig. 3, is a section on line 3, 3, of Fig. 1. Fig. 4, is a central sectional view of a chuck showing the frictionally held tap collet in position. Fig. 5, is a detached detail of the drill collet. Fig. 6, shows a detached detail of the tap collet, and Fig. 7, is a detail of one of the releasing dogs.

The aim of my invention is to provide a drill chuck so constructed that the same can be instantly changed into a tap or reamer holding tool.

In the drawings, the numeral 1, indicates the tapering shank and 2, the apertured head of the chuck. The head is reduced near its forward end to provide the stop shoulder 3, from which is continued the chuck portion 4, from which in turn is continued the reduced tubular extension 5, the end of which is threaded, as shown in Fig. 1. The shank 1, is traversed by the bore 6, shown in Fig. 1, ending in the cone seat 7, communicating with the head aperture 8. Entering the aperture through the reduced chuck portion 4, of the head, are four threaded openings 9, each being continued in a reduced unthreaded opening 10, shown in Fig. 2, which communicates with the head aperture 8. Held within the threaded openings 9, are the screws 11, each ending in a reduced trunnion 12, the trunnions projecting into the head aperture, as shown. Located within the tubular extension 5, at two diametrically opposite points are the cylindrical laterally entering openings 13, which also communicate with the head aperture 8.

Pivotally held upon the tubular extension 5, and the head portion 4, and stopped against the shoulder 3, is the collar 14. This collar, as shown in Fig. 3, has the apertures 15, with the communicating tangentially extending slots 16. The collar 14, as shown in Fig. 3, as well as the tubular chuck extension 5, are each provided with an arcuate recess within which is snugly held the coil spring 39. The recess within the extension 5, is marked 10', while the corresponding recess within the collar 14, is marked 9'. By means of this spring 39, the collar 14, is yieldingly held in position, the collar being stopped in one direction against the projecting ends of the dogs 20, as will be understood in referring to Fig. 3. The instrumentalities are so arranged that in its normal position the collar 14, is stopped against the dogs. In order to move the collar relative to the chuck, the tension of the spring 39, must be overcome.

As disclosed in Fig. 1, the nut 21, is provided with an incision 22, through which extends the cramp screw 24, held within the threaded opening 23, as clearly disclosed in Fig. 1.

Removably held within the cone seat 7, is the centering cone 25, having the conical extension 6′, arranged to seat within the centrally positioned opening 7′, within the end of the drill collet 27, this construction being clearly shown in Fig. 1. The drill collet, as shown, comprises the cylindrical member 27, arranged to accurately fit into the tubular extension 5, the collet, as shown in Fig. 1, having the tapering seat 28, ending in the lateral opening $x$, as is usual in the art.

The collet, as shown in detail in Fig. 5, is provided with the cannelure 29, arranged for co-action with the dogs 20, and the lengthwise running kerfs 30, arranged to snugly and accurately receive the trunnions 12, extending from the screws 11. The drill collet 28, which is shown in the drawings as being arranged to receive tapering shank twist drills and standard hand taps, can be instantly removed from the chuck in turning the collar 14, against the tension of the spring 39. This results in the dogs 20, being raised out of the cannelure in that the snugs 5′, slide within the tangentially extending slots 16, so that the dogs are carried radially outward so that the drill collet 27, can be easily removed. The centering opening 7′, within the end of the drill collet, is arranged for co-action with the cone portion 6′, insuring the collet being held true at its rear end. The dogs snugly hold the collet within the chuck head.

The construction described insures a drill being held within the socket 28, in a manner eliminating any side thrust which is caused whenever the spindle is out of alinement.

In tapping holes, it is a common occurrence for the taps to be broken through accident or carelessness, in allowing the taps to strike the bottom of the tapped opening. This results not only in a broken tap but often causes a great deal of labor in removing the hardened tap portion from the threaded opening. In my invention I provide a specially arranged tap holding collet so constructed that if the tap is suddenly stopped, as in becoming choked or striking the bottom of the opening, the tap carrying collet will be checked in its revolution, the chuck revolving about the tap collet. This I accomplish in frictionally holding the tap collet to the chuck. In Fig. 4, I have shown a drill chuck constructed as described, but in which view I disclose the tap holding collet in position. A detached detail of this collet is shown in Fig. 6. This collet 31, has the socket 8′, and ends in the cylindrical stem 34, which at its other end is threaded. At the end of the stem 34, the collet forms a cone bearing 33, and held upon this stem 34, and against the cone bearing 33, is the tension sleeve 35, having the terminal conical cup bearing 36, into which is arranged to seat the conical nut 37, as shown in Fig. 4. By means of the nut 37, the sleeve 35, is tensionally held upon the stem.

The degree of force under which the sleeve 35, is held to the tap collet can be accurately regulated by means of the cone nut 37, which is held in place by means of the lock nut 38. With this construction, should the tap carried by the collet 31, be suddenly stopped, the chuck 2, will continue to revolve, the sleeve 35, being rotated about the stem 34. It is of course understood that under normal conditions the members 34 and 35, are synchronously rotated and it is only when a resistance beyond a predetermined degree is placed upon the tap, that the tension sleeve 35, works independent of the stem 34.

From the foregoing it will be seen that I provide a chuck which acts automatically in releasing the tap carrying collet, should the progress of the tap be suddenly arrested.

As stated, a feature of this chuck is the total freedom from side thrust on the drill while doing rapid drilling and using fast feed. Further, the frictional contact of the sleeve with the collet stem can be nicely adjusted so as to be just strong enough to drive the tap.

Where my chucks are employed in connection with a reamer, the holes will be smooth, round and perfectly straight.

An incident of convenience to this arrangement of chucks is that the collets can be removed or inserted into the chuck without stopping the machine. The tool is simple and inexpensive in construction and both durable and efficient in operation, and the adjustment of the collets or the removal of the collets from the chuck may be accomplished with ease, accuracy and despatch.

Having thus described my said invention, what I claim as new and desire to secure by United States Letters Patent is:

1. In combination, a drill head having an extension and an internal aperture, said head having a plurality of laterally entering openings, trunnions within said openings extending into said head aperture, bearing openings communicating with said head aperture, a dog within each bearing opening each dog having an extending snug, a collar revolubly held upon said head having tangentially extending slots said snugs being slidably held within said slots, means to hold said collar to said head, a spring to yieldingly hold said collar in position, and a drill collet having lengthwise running kerfs for co-action with said trunnions and a cannelure for co-action with said dogs, the dogs being removably held within said cannelure.

2. In combination, a drill head having an extension and an external stop shoulder and an internal aperture, said head being provided with a plurality of laterally entering openings, trunnions within said openings extending into said head aperture, bearing openings communicating with said head aperture, a dog within each bearing opening each dog having an extending snug, a collar revolubly held against said stop shoulder having tangentially extending slots said snugs being slidably held within said slots, means to hold said collar to said head, a spring to yieldingly hold said collar in position, and a drill collet having lengthwise running kerfs for co-action with said trunnions and a cannelure for co-action with said dogs, the dogs being removably held within said cannelure.

3. In combination, a drill head having an external stop shoulder and an internal aperture ending in a cone seat, said head further having a plurality of laterally entering openings, trunnions adjustable within said openings extending into said head apertures, bearing openings communicating with said head aperture, a dog within each bearing opening each dog having an extending snug, a collar revolubly held upon said head having tangentially extending slots said snugs being slidably held within said slots, means to hold said collar to said head, a spring to yieldingly hold said collar in position, a drill collet having lengthwise running kerfs for co-action with said trunnions and a cannelure for co-action with said dogs, the dogs being removably held within said cannelure, and a centering cone within said cone seat.

4. An apertured drill head having laterally entering trunnion openings and adjacent bearing openings communicating with said head aperture, trunnions adjustable within said openings and extending into said head aperture, a dog within each bearing opening each dog having an extending snug, a collar revolubly held upon said head having tangentially extending slots for co-action with said snugs, means to revolubly hold said collar to said head, a spring to yieldingly hold said collar in one position, and a drill collet having lengthwise running kerfs for co-action with said trunnions and a cannelure for co-action with said dogs.

5. In combination, an apertured drill head having laterally entering trunnion openings and adjacent bearing openings communicating with said head aperture, trunnions adjustably held within said openings and extending into said head aperture, a dog within each bearing opening each dog having a guide face and an extending snug said guide faces working against the walls of said collar recesses said snugs working within said slots, a spring to normally force said collar in one direction against said dogs, means to hold said collar to said drill head, a centering cone within said head aperture, and a drill collet having a cannelure for co-action with said dog and lengthwise running kerfs engaged by said trunnions said collet having a centering seat to hold said cone.

6. A drill chuck including an apertured head having laterally entering trunnion openings and adjacent bearing openings communicating with said head aperture, trunnions adjustable within said openings and extending into said head aperture, a dog within each bearing opening each dog having an extending snug, a collar revolubly held upon said head having tangentially extending slots for co-action with said snugs, means to revolubly hold said collar to said head, a spring to yieldingly force said collar in one direction, a collet having a tapering stem, a sleeve revolubly held to said stem said sleeve having a cannelure engaged by said dogs and lengthwise running kerfs engaged by said trunnions, and means to revolubly hold said sleeve to said stem.

7. An apertured drill head having laterally entering trunnion openings and adjacent bearing openings communicating with said head aperture, trunnions adjustably held within said openings and extending into said head aperture, a dog within each bearing opening each dog having an extending snug, a collar revolubly held upon said head having tangentially extending slots for co-action with said snugs, means to revolubly hold said collar to said head, a spring to yieldingly force said collar in one direction, a collet having an extending stem, a sleeve revolubly held to said stem having a cannelure engaged by said dogs and lengthwise running kerfs engaged by said trunnions, means to revolubly hold said sleeve to said stem, and a centering cone engaging the end of said stem.

8. In combination, a chuck including an apertured head provided with an external stop shoulder and a tapering shank traversed by a lengthwise running bore said head being reduced to provide a tubular extension exteriorly threaded and trunnion openings within said head communicating with said aperture, of trunnions within said openings extending into said aperture, bearing openings located within said head communicating with said aperture, a dog within each bearing opening each dog having a guide face and an extending snug said dogs extending into said aperture, a collar revolubly held upon said head and stopped against said shoulder having apertures with tangentially extending slots said guide faces working against the walls of said last mentioned apertures said snugs being held within said slots, means to revolubly confine said collar, a tap collet ending in a tapering shank, a tension sleeve revolubly held upon said collet shank ending in a cone bearing and having a plurality of lengthwise running kerfs and a cannelure, said trunnions held within said kerfs, said dogs arranged to seat within said cannelure, and an adjustably held cone nut upon said collet shank arranged for co-action with said cone bearing said sleeve being frictionally held upon said collet shank.

9. In combination, a drill head having an internal aperture, said head having a plurality of laterally entering openings, trunnions adjustable within said openings extending into said head aperture, bearing openings communicating with said head aperture, a dog within each bearing opening each dog having an extending snug, a collar revolubly held upon said head having tangentially extending slots said snugs being slidably held within said slots, means to revolubly hold said collar to said head, a spring to yieldingly hold said collar in position, and a drill collet having lengthwise running kerfs for co-action with said trunnions and a cannelure for co-action with said dogs, the dogs being removably held within said cannelure.

In testimony whereof I affix my signature, in presence of two witnesses.

OSCAR J. F. BERGSTEN.

Witnesses:
CHARLES H. SAWYER,
DANIEL E. STACY.

---

Copies of this patent may be obtained for five cents each, by addressing the "Commissioner of Patents, Washington, D. C."